March 17, 1942.      W. B. SHELLABARGER      2,276,549
ELECTRODE HOLDER
Filed June 18, 1941
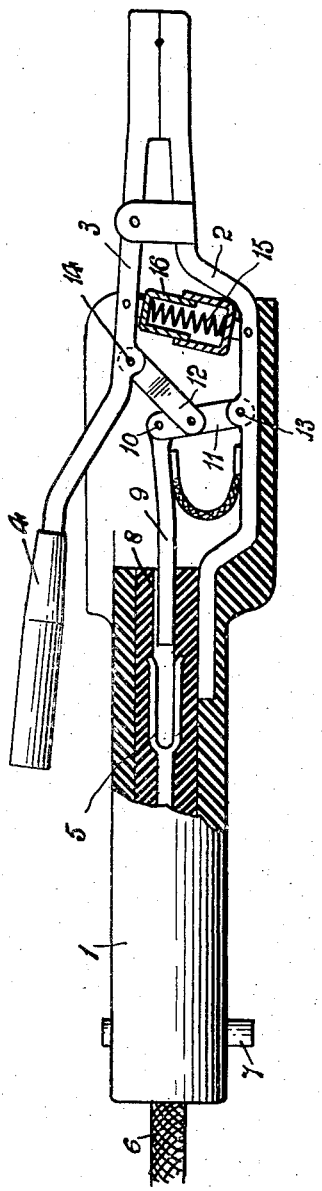
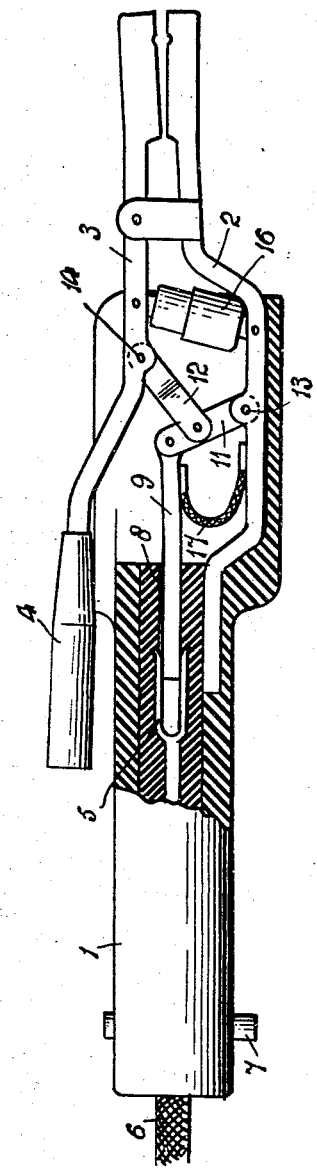
William B. Shellabarger
INVENTOR.
BY Stanley Lightfoot
ATTORNEY.

Patented Mar. 17, 1942

2,276,549

UNITED STATES PATENT OFFICE 2,276,549

ELECTRODE HOLDER

William B. Shellabarger, Detroit, Mich.

Application June 18, 1941, Serial No. 398,642

4 Claims. (Cl. 219—8)

This invention relates to electrode holders, more particularly of the type wherein the welding wire is engaged between hinged spring-pressed jaws operated by a suitable lever or handle.

When either of these jaws is connected to a live cable there is always danger of the jaws being brought into contact with the work or with the person or the operator while the tool is being moved around when there is no welding wire in the holder; and to avoid such danger it has been heretofore proposed to provide a switch in the handle of the holder, or in the cable, so that the current may be shut off between actual welding operations. However, due to forgetfulness, or due to the carelessness of familiarity with the tool, the switch frequently remains closed after the welding wire had been removed from the holder, and accidents to the person and danger to the work frequently occur as a result.

It is, therefore, an object of the present invention to provide in an electrode holder, a simple and effective means for insuring that the current will be shut off from the jaws of the holder at all times when the welding wire is removed therefrom, irrespective of the operation of the master switch.

More particularly, the invention contemplates the inclusion in the device of a switch operable by one of the jaw members to close upon the opening of the jaws to receive a welding wire and to open when the jaws are closed upon the removal of the welding wire; and a further object is to provide in such switch mechanism a form of linkage which will amplify the motion of the jaw member to insure an efficient making and breaking of the switch contacts with but a comparatively small opening and closing movement of the jaw member.

Still further, the said invention provides in an electrode holder having a movable lever or handle for operation of the jaws, a toggle mechanism operated by the said handle or lever, said mechanism operating a switch contact in a manner designed to secure the safety features referred to.

Still further objects and advantages subsidiary to the aforesaid objects, or resulting from the construction or operation of the invention as it may be carried into effect, will become apparent as the invention is hereinafter further disclosed.

In carrying the said invention into effect, I may provide in an electrode holder having a pair of hinged jaws, one of which is mounted in an insulated grip and the other extended to form an operating handle for opening and closing the jaws, a cable-connected contact member within the grip, and a second contact movable to and from the first mentioned contact by a toggle linkage operated by the said operating handle. All of which is more particularly described and ascertained hereinafter, by way of example, having reference to the accompanying drawing wherein:

Figure 1 is a sectional elevation of an electrode holder embodying the said invention, the jaws being indicated in a closed position; and Figure 2 is a similar view illustrating the position of the parts when the jaws are open.

Similar characters of reference indicate similar parts in both figures of the drawing.

The grip 1 of the holder, preferably composed entirely of insulating material, carries the lower jaw member 2 of the device to which is hinged the upper jaw member 3 extended rearwardly to form the jaw-operating handle or lever 4, all of which is merely conventional structure.

Within the insulated grip is a contact member 5, which in this example is indicated as being of a bifurcated form and is connected to a power cable 6 through a master switch 7, if this latter is desired. The presence or form of the master switch is not a feature of the present invention and it is accordingly not illustrated or described in detail.

The insulated grip 1 is provided with a bore 8 in its forward end communicating with the bifurcated contact 5, and in this bore is reciprocally located a contact 9 connected to the free end 10 of the link 11 of a toggle mechanism 11, 12. These links 11 and 12 are hingedly connected at 13 and 14 to the jaw members 2 and 3 respectively, as shown. 15 is the usual compression spring which may be housed in a telescopic casing 16 and serves to urge the jaws to enter into their closed position, and 17 is a flexible connection between the contact 9 and the jaw member 2 to provide direct electrical connection between the said contact 12 and the said member 2 as is desirable.

The proportions of the parts and the linkage of the contact member 9 is such that when the jaws are closed, as in Figure 1, the said contact member 9 is materially withdrawn from the contact member 5, but upon slight separation of the jaws, as when a welding wire is inserted therebetween, movement of the contact member 9 into engagement with the member 5 results. However, if the welding wire is removed, upon completion of the work or preparatory to inserting a new wire in the holder, the closing of the jaws by the spring 15 causes the toggle linkage to withdraw the contact member 8 from the contact member 5 thereby rendering the jaws of the holder "dead" and, therefore, harmless to the operator or his surroundings even though the master switch 7 may not have been opened.

The device described provides for a high degree of safety which is not dependant on forethought on the part of the operator and which is not secured at the expense of great complication, and the nature of the mechanism is such that it may be very robustly constructed without materially adding to the weight of the device or to its cost of construction.

This invention may be developed within the scope of the following claims without departing from the essential features of the said invention, and it is desired that the specification and drawing be read as being merely illustrative and not in a strictly limiting sense.

What I claim is:

1. In an electrode holder, a grip, jaw members supported from said grip, means for opening and closing said jaw members, a fixed contact within said grip, a movable contact electrically connected with said jaw members, and motion transmitting means coupling said movable contact with said jaw operating means whereby said movable contact is moved thereby into and out of engagement with said fixed contact when said jaw members are opened and closed.

2. In an electrode holder, a grip, jaw members supported from said grip, jaw operating means for opening and closing said jaw members, a fixed contact within said grip, a movable contact electrically connected with said jaw members, and toggle means coupled to said movable contact and to said jaw operating means to move said movable contact into and out of engagement with said fixed contact when said jaw members are opened and closed.

3. In an electrode holder, a grip, jaw members supported from said grip, a hinged jaw operating member for opening and closing said jaw members, a fixed contact within said grip, a movable contact electrically connected with said jaw members, and motion transmitting means coupling said movable contact with said jaw operating member whereby said movable contact is moved thereby into and out of engagement with said fixed contact when said jaw members are opened and closed.

4. In an electrode holder, a grip, jaw members supported from said grip, a hinged jaw operating member for opening and closing such jaw members, a fixed contact within said grip, a movable contact electrically connected with said jaw members, and toggle means coupled to said movable contact and to said jaw operating member to move said movable contact into and out of engagement with said fixed contact when said jaw members are opened and closed.

WILLIAM B. SHELLABARGER.